(12) United States Patent
Petersson et al.

(10) Patent No.: US 11,329,399 B2
(45) Date of Patent: May 10, 2022

(54) ANTENNA ARRANGEMENT FOR DUAL-POLARIZATION BEAMFORMING

(71) Applicant: Telefonaktiebolaget LM Ericsson (publ), Stockholm (SE)

(72) Inventors: Sven Petersson, Sävedalen (SE); Andreas Nilsson, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 395 days.

(21) Appl. No.: 15/767,160

(22) PCT Filed: Mar. 21, 2018

(86) PCT No.: PCT/EP2018/057187
§ 371 (c)(1),
(2) Date: Apr. 10, 2018

(87) PCT Pub. No.: WO2019/179617
PCT Pub. Date: Sep. 26, 2019

(65) Prior Publication Data
US 2020/0243985 A1 Jul. 30, 2020

(51) Int. Cl.
*H01Q 21/24* (2006.01)
*H01Q 21/06* (2006.01)
(Continued)

(52) U.S. Cl.
CPC ......... *H01Q 21/245* (2013.01); *H01Q 21/061* (2013.01); *H01Q 21/10* (2013.01); *H01Q 21/24* (2013.01); *H04B 7/04* (2013.01)

(58) Field of Classification Search
CPC ...... H01Q 21/10; H01Q 21/061; H01Q 21/24; H01Q 9/30; H01Q 3/32; H01Q 21/08;
(Continued)

(56) References Cited

U.S. PATENT DOCUMENTS

2007/0205955 A1* 9/2007 Korisch ................. H01Q 3/267 343/853
2008/0026697 A1* 1/2008 Signell ................... H01Q 19/28 455/66.1
(Continued)

FOREIGN PATENT DOCUMENTS

CN 104 052 529 9/2014
CN 104052529 A 9/2014
(Continued)

OTHER PUBLICATIONS

Transmittal of International Search Report and Written Opinion of the International Searching Authority, International Search Report, and Written Opinion of the International Searching Authority, PCT/EP2018/057187, dated Nov. 30, 2018, 18 pages.
(Continued)

*Primary Examiner* — Ricardo I Magallanes
(74) *Attorney, Agent, or Firm* — Sage Patent Group

(57) ABSTRACT

There is provided an antenna arrangement. The antenna arrangement comprises a baseband chain. The antenna arrangement comprises an antenna array. The antenna array is coupled to the baseband chain and divided into a first sub-array and a second sub-array. The first sub-array comprises antenna elements of only a first polarization and the second sub-array comprises antenna elements of only a second polarization. The first sub-array and the second sub-array have their antenna elements at identical locations relative each other, except for the antenna elements of the first sub-array and the antenna elements of the second sub-array being translated, but not rotated, relative each other.

19 Claims, 4 Drawing Sheets

(51) Int. Cl.
  *H01Q 21/10* (2006.01)
  *H04B 7/04* (2017.01)
(58) Field of Classification Search
  CPC ........ H01Q 21/28; H01Q 25/001; H04B 7/04; H04L 5/14
  See application file for complete search history.

(56) References Cited

U.S. PATENT DOCUMENTS

| | | | | |
|---|---|---|---|---|
| 2014/0098689 | A1* | 4/2014 | Lee | H04B 7/0639 370/252 |
| 2015/0229460 | A1* | 8/2015 | Mohamadi | B29C 64/135 375/130 |
| 2015/0333885 | A1* | 11/2015 | Athley | H04B 7/0658 375/219 |
| 2018/0048077 | A1* | 2/2018 | Zhang | H01Q 25/001 |
| 2018/0316096 | A1* | 11/2018 | Harauchi | H01Q 21/0093 |

FOREIGN PATENT DOCUMENTS

| | | | | |
|---|---|---|---|---|
| DE | 102011121138 A1 | * | 6/2013 | ............... H01Q 3/04 |
| EP | 3553887 A1 | * | 10/2019 | ............. H01Q 21/24 |
| JP | 2005167407 A | | 6/2005 | |
| WO | WO 2011/050866 A1 | | 5/2011 | |
| WO | WO 2016/010685 A1 | | 1/2016 | |
| WO | 2016141961 A | | 9/2016 | |
| WO | WO 2017/190777 A1 | | 11/2017 | |

OTHER PUBLICATIONS

Qualcomm, Beam Management for NR, 3GPP TSG RAN1 #89, Hangzhou, P.R. China, May 15-19, 2017, R1-1708586, XP051262554, May 6, 2017, 9 pages.
Application as filed for "Dual-Polarization Beamforming," assigned International Application No. PCT/EP2017/050514 and filed Jan. 12, 2017, not yet published.
Office Action dated Dec. 7, 2021 for Japanese Patent Application No. 2020-550631, 12 pages (includes English translation).

\* cited by examiner

ANTENNA ARRANGEMENT FOR DUAL-POLARIZATION BEAMFORMING

CROSS REFERENCE TO RELATED APPLICATION

This application is a 35 U.S.C. § 371 national stage application of PCT International Application No. PCT/EP2018/057187, filed on Mar. 21, 2018, the disclosure and content of which is incorporated by reference herein in its entirety.

TECHNICAL FIELD

Embodiments presented herein relate to an antenna arrangement, a method, a radio transceiver device, a computer program, and a computer program product for dual-polarization beamforming.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the access node of the network and at the wireless devices might be required to reach a sufficient link budget.

The wireless devices could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different wireless devices, different implementations will be needed.

Different antenna architectures for different frequency bands are being discussed for wireless devices. At high frequency bands (e.g. above 15 GHz) something called "panels" of antenna arrays are being discussed. These panels of antenna array may be uniform linear/rectangular arrays (ULAs/URAs), for example steered by using analog phase shifters. In order to get coverage from different directions, multiple panels of antenna array can be mounted on different sides of the wireless devices. Unless specifically stated, the terms antenna array and panels will hereinafter be used interchangeably.

For wireless devices the incoming signals can arrive from all different directions, hence it could be beneficial to have an antenna configuration at the wireless device which has the possibility to generate omnidirectional-like coverage in addition to high gain narrow directional beams. For example, if the wireless device rotates quickly it could be difficult to maintain narrow beam communication with the radio access network node serving the wireless devices, and hence a more robust omnidirectional coverage would temporarily be preferred at the wireless device.

However, for antenna arrays with single polarized antenna elements (and an analog distribution network) it can be challenging to generate beams with a large variety in beam widths. Hence, panels with dual-polarized antenna elements are preferred such that dual-polarized beamforming, can be used to generate beams with basically any beamwidths, ranging from the beamwidth of a single antenna element to the beamwidth as given by co-phasing all antenna elements of the entire antenna array.

FIG. 1 schematically illustrates a wireless device 200' comprising an example architecture of an analog antenna array 150a that can be used to generate a large variety of beamwidths. The analog antenna array 150a has four single polarized antenna elements 160a operatively connected to an analog distribution network 170a with one phase shifter and switch per antenna element 160a. In turn the analog distribution network 170a is operatively connected to a single baseband (BB) chain 140a. A further antenna array 150b with single polarized antenna elements 160b and being operatively connected to a further baseband chain 140b via its own analog distribution network 170b could be provided in order to enable communication using orthogonal polarization.

Regulatory limitations on emissions for wireless devices operating at higher frequency bands results in that only limited output power can be applied per square centimeter. Hence, it is beneficial to spread the antenna elements out as much as possible in space at the wireless device to maximize the allowed output power. Also, antenna elements located to close to each other might cause local overheating at the wireless device. However, to generate a beam by the analog beamformer at a wireless device it is preferred that the antenna elements of the antenna array are located close to each other (in the order of 0.5 wavelengths of the carrier frequency used for signal transmission and reception) such that grating lobes can be avoided.

Hence, there is still a need for improved antenna arrangements for radio transceiver devices, such as wireless devices.

SUMMARY

An object of embodiments herein is to provide an improved antenna arrangement that can be used in a radio transceiver device, such as a wireless device, and that does not suffer from the issues noted above, or at least where these issues are reduced or mitigated.

According to a first aspect there is presented an antenna arrangement. The antenna arrangement comprises a baseband chain. The antenna arrangement comprises an antenna array. The antenna array is coupled to the baseband chain and divided into a first sub-array and a second sub-array. The first sub-array comprises antenna elements of only a first polarization and the second sub-array comprises antenna elements of only a second polarization. The first sub-array and the second sub-array have their antenna elements at identical locations relative each other, except for the antenna elements of the first sub-array and the antenna elements of the second sub-array being translated, but not rotated, relative each other.

Advantageously this antenna arrangement can be used in a radio transceiver device, such as a wireless device, and that does not suffer from the issues noted above.

Advantageously this antenna arrangement can be used to create flexible beam shapes by using dual-polarized beamforming while at the same time have an antenna array that is distributed spatially such that the maximum allowed output power could be increased, compared to the antenna arrangement in FIG. 1, without exceeding regulatory emission limits.

According to a second aspect there is presented a radio transceiver device. The radio transceiver device comprises an antenna arrangement according to the first aspect.

According to a third aspect there is presented a method for dual-polarization beamforming. The method is performed by a radio transceiver device according to the second aspect. The method comprises communicating signals by feeding the signals through the antenna arrangement.

According to a fourth aspect there is presented a computer program for dual-polarization beamforming, the computer program comprising computer program code which, when run on a radio transceiver device according to the second aspect, causes the radio transceiver device to perform a method according to the third aspect.

According to a fifth aspect there is presented a computer program product comprising a computer program according to the fourth aspect and a computer readable storage medium on which the computer program is stored. The computer readable storage medium could be a non-transitory computer readable storage medium.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or to feature illustrated by dashed lines should be regarded as optional.

Figure 1:
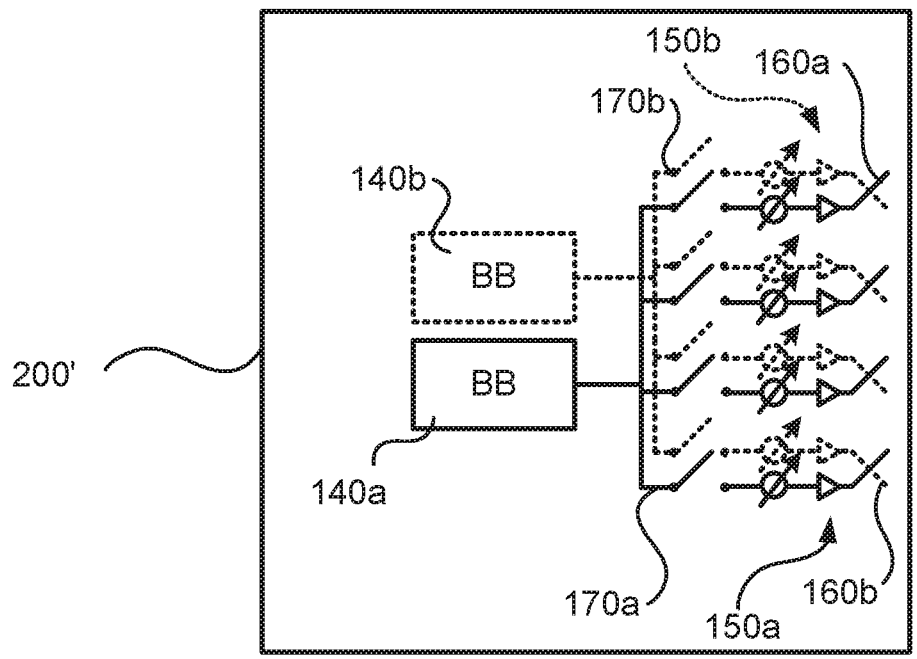
FIG. 1 schematically illustrates an antenna arrangement according to prior art.
Figure 2:
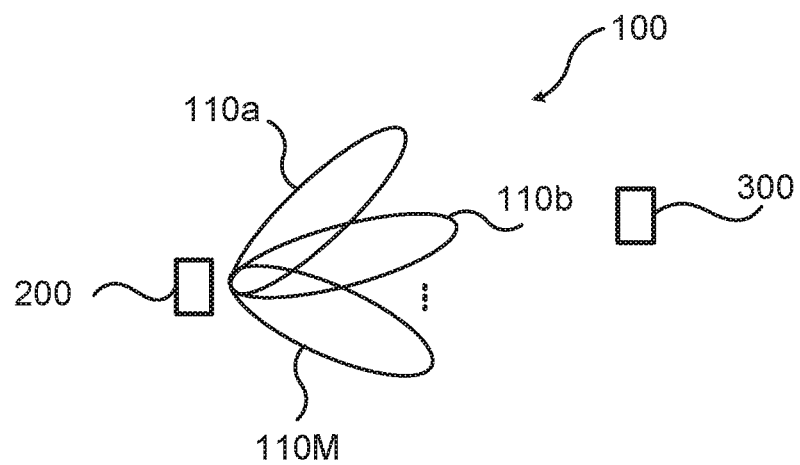
FIG. 2 is a schematic diagram illustrating a communications system according to embodiments.

FIG. 2 is a schematic diagram illustrating a communications system 100 comprising a radio transceiver device implemented as a radio access network node 300 providing network access to a radio transceiver device implemented as a wireless device 200. The wireless device 200 is assumed to comprise at least one receiver chain and is configured to receive signals from the radio access network node 300 in M beams 110a, 110b, . . . , 110M. The beams 110a, 110b, . . . , 110M might all have the same width, or at least two of the beams 110a, 110b, . . . , 110M have mutually different widths. The wireless device 200 is thus configured to communicate in M beams 110a, 110b, . . . , 110M (in contrast to omnidirectional beams).

The radio access network node 300 could be any of an access node, radio base station, base transceiver station, node B, evolved node B, g node B, access point, or the like. The wireless device 200 could be any of a wireless device, mobile station, mobile phone, handset, wireless local loop phone, user equipment (UE), smartphone, laptop computer, tablet computer, wireless sensor, or the like.

As disclosed above it is beneficial to spread the antenna elements out as much as possible in space at the wireless device to maximize the allowed output power whilst having the antenna elements located close to each other in order to generate beams without grating lobes.

Hence there is disclosed an antenna arrangement that enables the antenna elements to be spread out whilst still enabling beam without grating lobes to be generated.

Figure 3:
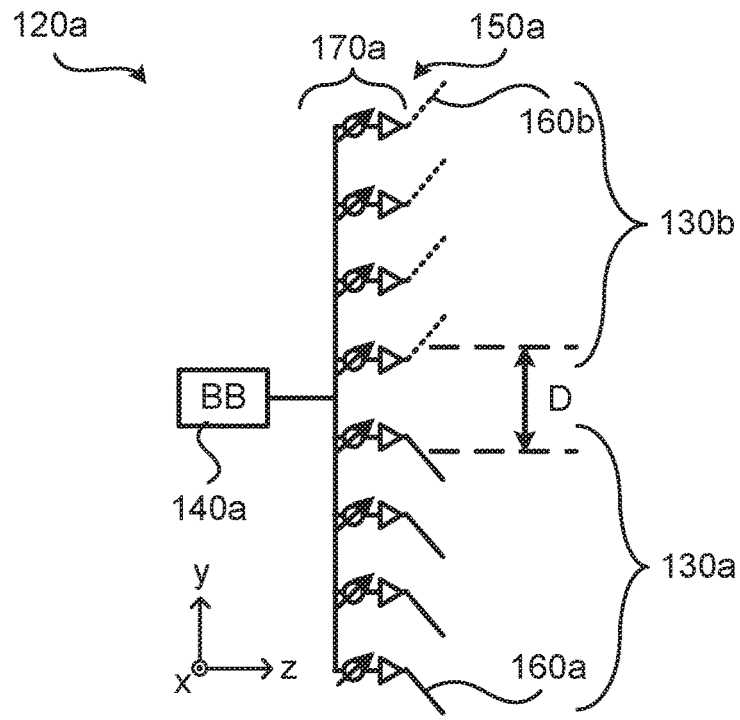
FIGS. 3, 4, 5, and 6 schematically illustrate antenna arrangements according to embodiments.

Reference is now made to FIG. 3. FIG. 3 schematically illustrates an antenna arrangement 120a, placed in a three dimensional Cartesian coordinate system x-y-z, according to an embodiment.

The antenna arrangement 120a comprises a baseband chain 140a and an antenna array 150a. The antenna array 150a is coupled to the baseband chain 140a. The antenna array 150a is divided into a first sub-array 130a and a second sub-array 130b. The first sub-array 130a comprises antenna elements 160a of only a first polarization and the second sub-array 130b comprises antenna elements 160b of only a second polarization.

The first sub-array 130a and the second sub-array 130b have their antenna elements 160a, 160b at identical locations relative each other, except for the antenna elements 160a, 160b of the first sub-array 130a and the antenna elements 160a, 160b of the second sub-array 130b being translated, but not rotated, relative each other.

The antenna array 150a is thus divided into two sub-arrays 130a, 130b, where the sub-array 130a, 130b consists of antenna elements 130a, 160b of mutually orthogonal polarizations and where the two sub-arrays 130a, 130b have a spatial distance between each other.

In other words, the entire configuration of antenna elements 160b in the second sub-array 160b is translated relative the configuration of antenna elements 160a in the first sub-array 160a. All antenna elements 160b of the second sub-array 130b are thus translated in the same way with respect to the antenna elements 160a of the first sub-array 130a.

This type of antenna arrangement 120a offers both conventional beamforming, shaping narrow beams, as well as possibilities of creating different beamwidths.

In the illustrative example of FIG. 3 the antenna arrangement 120a comprises one antenna array 150a, or panel, with eight single-polarized antenna elements 160a, 160b, four of each polarization, and an analog distribution network 170a with analog phase shifters and power amplifiers. Having one power amplifier per antenna element 160a, 160b (i.e., distributed power amplifiers) is just one option; another option is to have a central power amplifier feeding all antenna elements 160a, 160b via the phase shifters. The antenna array 150a is divided in to two sub-arrays 130a, 130b, where the second sub-array 130b is stacked vertically on top of the first sub-array 130b, and where each sub-array 130a, 130b consists of antenna elements 160a, 160b of only one polarization. The two sub-arrays 130a, 130b are separated in the vertical direction by a separation distance D. The separation distance D can be properly selected based on the heat generation in the antenna arrangement 120a, regulatory emission limits, etc. The antenna elements 160a, 160b of different sub-arrays 130a, 130b are orthogonal to each other. The signals received from all antenna elements 160a, 160b of both sub-arrays 130a, 130b are combined and fed to one single baseband chain 140a.

In the example in FIG. 3 the separation distance D is in parallel with the extension of the antenna array 150a (as exemplified by the positive y direction in FIG. 3). However, the two sub-arrays 130a, 130b could be separated in any direction, and still fulfilling the necessary symmetry requirements needed for dual-polarized beamforming. One requirement, however, is that the two sub-arrays 130a, 130b are pointing in the same direction (as exemplified by the positive z direction in FIG. 3). The antenna arrangements 120b, 120C in FIGS. 4 and 5 are examples of antenna arrangements having sub-arrays 130a, 130b and antenna elements 160a, 160b fulfilling these necessary symmetry requirements.

Figure 4:
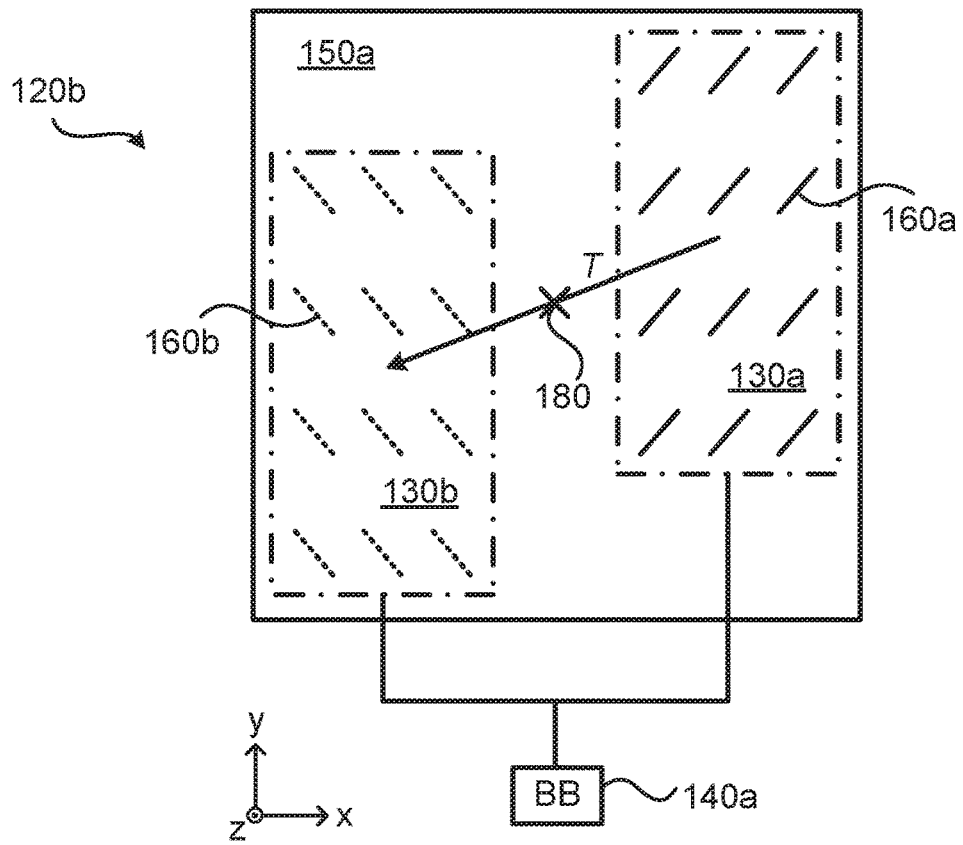

According to the illustrative example of FIG. 4, the antenna arrangement 120b, as placed in the coordinate system x-y-z, comprises an antenna array 150a being a uniform rectangular array (URA) for which the antenna elements 160a, 160b of each sub-array 130a, 130b are located on a rectangular grid with fixed spacing between the antenna elements 16a, 160b.

The spacing may be different for the vertical direction and the horizontal direction, respectively. Each of the two sub-arrays 130a, 130b may thus represent their own URAs where the first URA contains antenna elements of a first polarization and the second URA contains elements of a second polarization.

Figure 5:
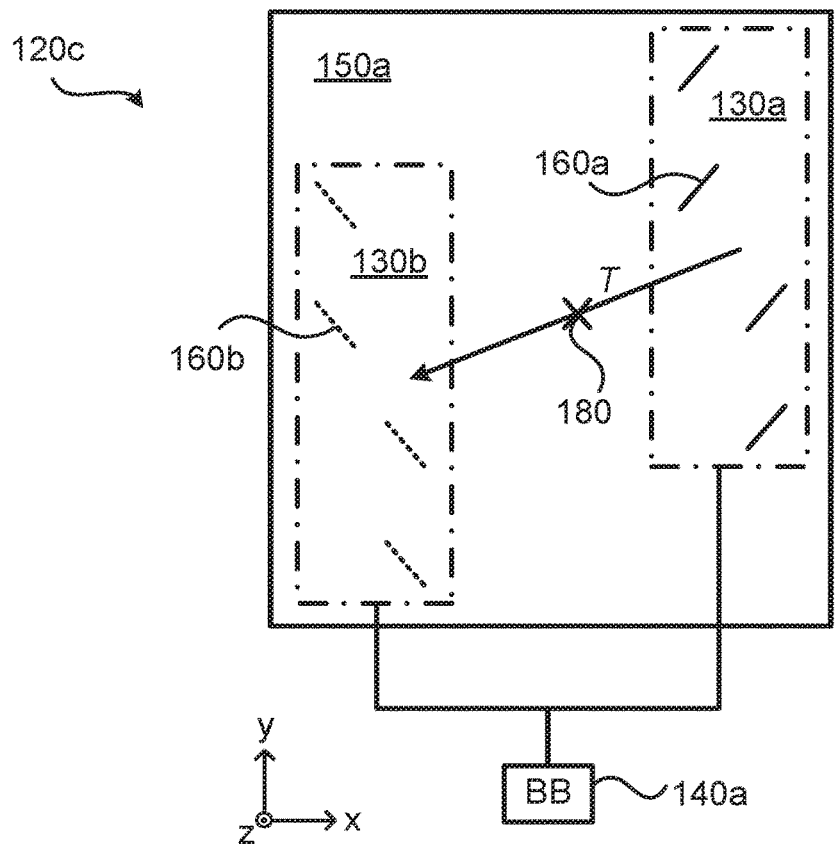

According to the illustrative example of FIG. 5, the antenna arrangement 120c, as placed in the coordinate system x-y-z, comprises an antenna array 150a similar to that one in FIG. 4 but not being a URA, or at least where the antenna elements 160a, 160b of each sub-array 130a, 130b are not located on a URA.

In both FIGS. 4 and 5 the antenna elements 160b of the second sub-array 130b are located such that each of the individual antenna elements 160b has the same position as a corresponding individual antenna element 160a of the first antenna array 130a, except from a translation T of the entire second sub-array 130b. The resulting symmetry point is indicated by the black cross 180.

Embodiments relating to further details of the antenna arrangement will now be disclosed.

In some aspects the antenna elements 160a of the first sub-array 130a and the antenna elements 160b of the second sub-array 130b have the same (or very similar) power patterns. That is, according to an embodiment all the antenna elements 160a, 160b have same power pattern.

There might be different ways to enable the sub-arrays 130a, 130b to be separated such that the sub-arrays 130a, 130b do not physically overlap with each other in the pointing direction of the antenna array 150a. Particularly, according to an embodiment the antenna array 150a has a pointing direction (in FIGS. 3, 4, 5, 6 along the positive z direction), and the first sub-array 130a and the second sub-array 130b are translated relative each other to not physically overlap with each other in the pointing direction.

In some aspects the first sub-array 130a and the second sub-array 130b are physically separated from each other by at least a minimum separation distance. That is, in some aspects the separation distance D has at least a minimum value. Particularly, according to an embodiment, the first sub-array 130a and the second sub-array 130b are translated relative each other at least a minimum distance. The minimum distance is then selected according to a heat generation criterion. The heat generation criterion could, for example, specify how much heat the antenna arrangement is allowed to generate per area unit (such as per square centimeter). In some aspects the minimum distance is additionally, or alternatively, selected according to a radiation emission limit. Hence, by measuring the heat generation for different separation distances it is possible to select the separation distance D as small as possible but still such that the heat generation criterion is fulfilled.

There could be different ways to connect the antenna array 150a to the baseband chain 140a. In some aspects the antenna arrangement comprises an analog distribution network 170a. According to an embodiment the antenna array 150a is coupled to the baseband chain 140a via the analog distribution network 170a.

There could be different types of analog distribution networks 170a. According to an embodiment the analog distribution network 170a comprises analog phase shifters, power amplifiers and/or low noise amplifiers.

There could be different types of first and second polarizations. In some aspects the first sub-arrays 130a and the second sub-array 130b have mutually orthogonal antenna elements 160a, 160b. That is, according to an embodiment the first polarization and the second polarization are mutually orthogonal.

There could be different types of first sub-arrays 130a and second sub-arrays 130b. Examples include, but are not limited to, uniform linear arrays, uniform rectangular arrays, and irregular one-dimensional arrays.

According to a first embodiment the antenna elements 160a, 160b of the first sub-array 130a and the second sub-array 130b are located in accordance with one and the same uniform linear array. This is the case for the first sub-array 130a and the second sub-array 130b in FIG. 3.

According to a second embodiment the antenna elements 160a, 160b of the first sub-array 130a and the second sub-array 130b are located in accordance with one and the same uniform rectangular array. This is the case for the first sub-array 130a and the second sub-array 130b in FIG. 4.

According to a third embodiment the antenna elements 160a, 160b of the first sub-array 130a and the second sub-array 130b are located in accordance with one and the same irregular one-dimensional array. There could be different examples of irregular one-dimensional arrays. In one example the irregular one-dimensional array is defined by two uniform linear arrays. This is the case for the first sub-array 130a and the second sub-array 130b in FIG. 5 where each sub-array 130a, 130b is defined by two pair-wise uniform linear arrays, where each of the sub-arrays 130a, 130b consists of two piece-wise uniform linear arrays with two antenna elements in each uniform linear array.

According to a fourth embodiment the antenna elements 160a, 160b of the first sub-array 130a and the second sub-array 130b are located in accordance with one and the same irregular two-dimensional array.

By using an antenna array 120a, 120b, 120c with antenna elements 160a, 160b of mutually orthogonal polarizations connected to one single baseband processing chain 140a, it is possible to generate a large variety of beam shapes for the baseband processing chain 140a. Applying principles disclosed in document WO2011/050866A1 it is, for example, possible to generate as wide array beamwidth as the element beamwidth regardless of how many antenna elements 160a, 160b there is in the antenna array 150a, thus resulting in dual-polarization beamforming.

Figure 6:
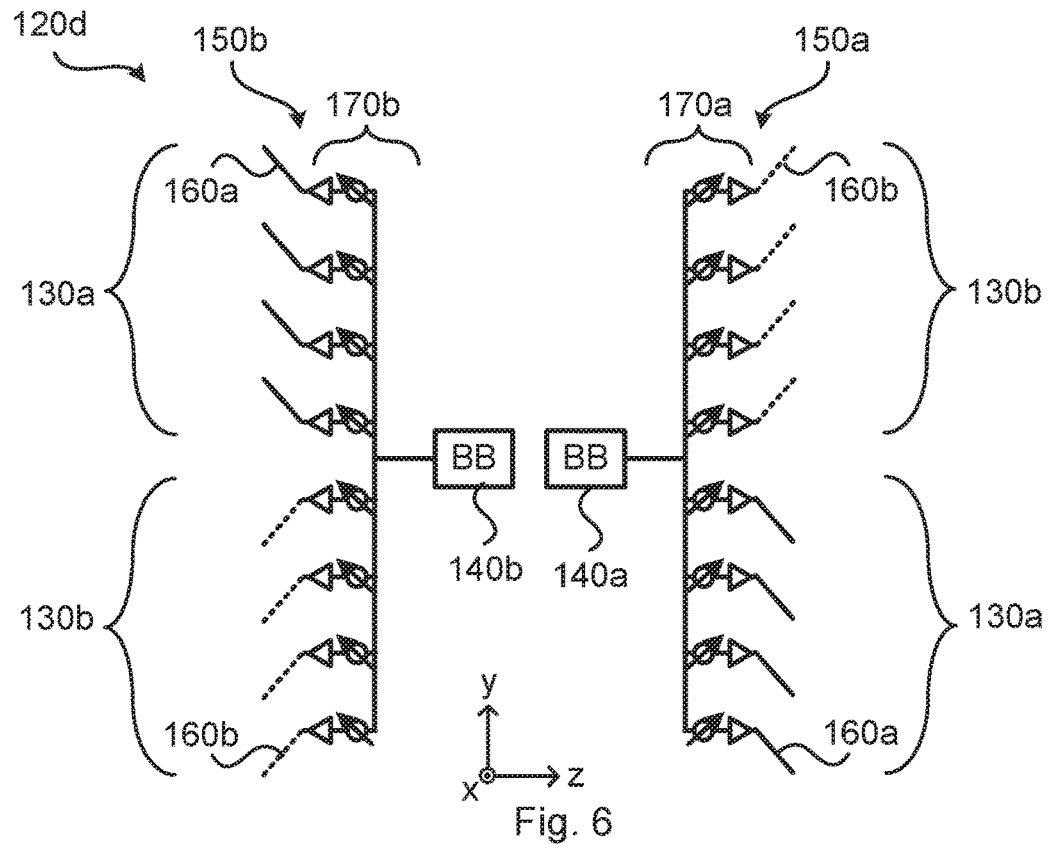

In some aspects the antenna arrangement comprises more than one antenna array. Hence, according to an embodiment the antenna arrangement comprises at least two antenna arrays 150a, 150b, where each of the at least two antenna arrays 150a, 150b is coupled to its own baseband chain 140a, 140b. FIG. 6 gives an example of an antenna arrangement 120d, as placed in the coordinate system x-y-z, having two antenna arrays 150a, 150b. Each of the two antenna arrays 150a, 150b could be configured according to the antenna arrays of any of the antenna arrangements 120a, 120b, 120c.

According to an embodiment each of the at least two antenna arrays 150a, 150b has its own pointing direction. This is the case in FIG. 6 where one antenna arrangement 150a points in the positive z direction and the other antenna arrangement 150b points in the negative z direction.

Having two antenna arrays 150a, 150b with antenna elements 160a, 160b of both polarizations located on opposite side of a radio transceiver device 200 could improve the omni-directional coverage of the radio transceiver device 200.

Figure 7:
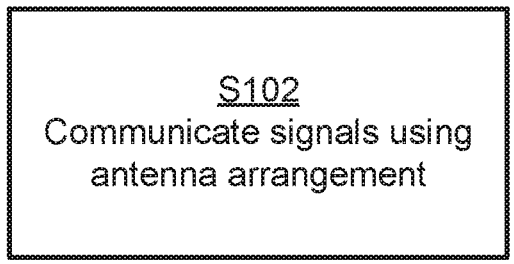
FIG. 7 is a flowchart of a method according to an embodiment.

FIG. 7 is a flowchart illustrating embodiments of a method for dual-polarization beamforming. The method is performed by the radio transceiver device 200. The radio transceiver device 200 comprises an antenna arrangement 120a, 120b, 120C, 120d as disclosed above. The method is advantageously provided as a computer program 1020.

S102: The radio transceiver device 200 communicates signals by feeding the signals through the antenna arrangement 120a, 120b, 120c, 120d.

The signals could be any type of signals, such as reference signals, control signals, and/or data signals.

Figure 8:
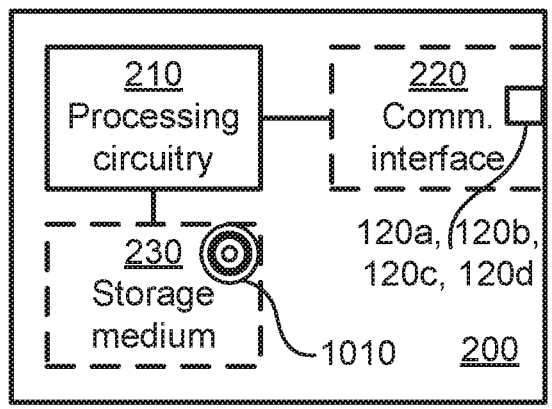
FIG. 8 is a schematic diagram showing functional units of a radio transceiver device according to an embodiment.

FIG. 8 schematically illustrates, in terms of a number of functional units, the components of a radio transceiver device 200 according to an embodiment.

Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200 to perform a set of operations, or steps, as disclosed above. For example, the storage medium 230 may store the set of operations, and the processing circuitry 210 may be configured to retrieve the set of operations from the storage medium 230 to cause the radio transceiver device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200 may further comprise a communications interface 220 at least configured for communications with another radio transceiver device 300. As such, the communications interface 220 may comprise one or more transmitters and receivers, comprising analogue and digital components. In this respect the radio transceiver device 200 comprises an antenna arrangement 120a, 120b, 120c, 120d as disclosed above and which thus might be part of the communications interface 220.

The processing circuitry 210 controls the general operation of the radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200 are omitted in order not to obscure the concepts presented herein.

Figure 9:
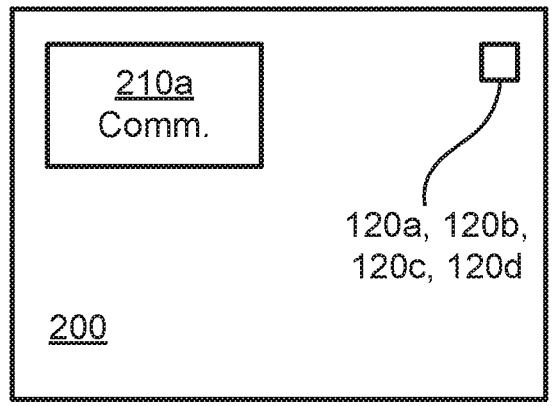
FIG. 9 is a schematic diagram showing functional modules of a radio transceiver device according to an embodiment.

FIG. 9 schematically illustrates, in terms of a number of functional modules, the components of a radio transceiver device 200 according to an embodiment. The radio transceiver device 200 of FIG. 9 comprises a communicate module 210a configured to perform step S102. In some aspects the communicate module 210a is implemented by the processing circuitry 210 and the communications interface 220. In some aspects the radio transceiver device 200 of FIG. 9 further comprises an antenna arrangement 120a, 120b, 120c, 120d as herein disclosed.

The radio transceiver device 200 of FIG. 9 may further comprise a number of optional functional modules. In general terms, the functional module 210a may in one embodiment be implemented only in hardware and in another embodiment with the help of software, i.e., the latter embodiment having computer program instructions stored on the storage medium 230 which when run on the processing circuitry makes the radio transceiver device 200 perform the corresponding steps mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 210a may be implemented by the processing circuitry 210, possibly in cooperation with the communications interface 220 and/or the storage medium 230. The processing circuitry 210 may thus be configured to from the storage medium 230 fetch instructions as provided by a functional module 210a and to execute these instructions, thereby performing any steps as disclosed herein.

The radio transceiver device 200 may be provided as a standalone device or as a part of at least one further device. In some aspects the radio transceiver device 200 is, or is provided in, a wireless device.

Figure 10:
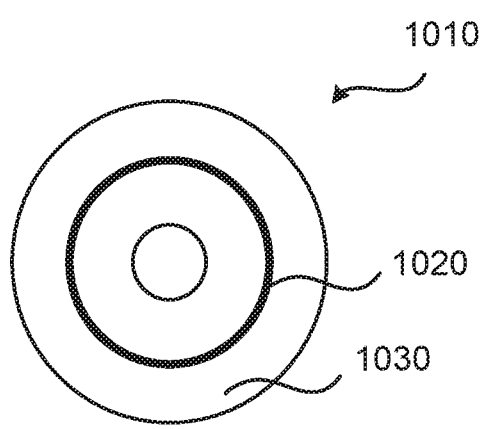
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. An antenna arrangement, the antenna arrangement comprising:
two baseband chains;
two antenna arrays, wherein each of the two antenna arrays is coupled to a corresponding baseband chain of the two baseband chains, and each has a pointing direction and is divided into a first sub-array and a second sub-array,
wherein the two pointing directions are opposite to each other,
wherein the first sub-array of each antenna array comprises antenna elements of only a first polarization and the second sub-array of each antenna array comprises antenna elements of only a second polarization different from the first polarization,
wherein the first polarization of one of the two antenna arrays and the first polarization of the other of the two antenna arrays are of the same polarization,
wherein the second polarization of one of the two antenna arrays and the second polarization of the other of the two antenna arrays are of the same polarization,
wherein the antenna elements of the first sub-array of a corresponding antenna array are located such that each of the antenna elements of the first sub-array has a same position within the first sub-array as a corresponding antenna element within the second sub-array of the corresponding antenna array,
wherein the entire second sub-array of a corresponding antenna array is translated at least a minimum physical distance from, but not rotated, relative to the entire first sub-array of the corresponding antenna array,
wherein the minimum physical distance is selected according to at least one of (i) a heat generation criterion that avoids overheating of the antenna arrangement and (ii) emission of the antenna arrangement within a regulatory emission limit.

2. The antenna arrangement according to claim 1, wherein all the antenna elements have a same power pattern.

3. The antenna arrangement according to claim 1, wherein the first sub-array and the second sub-array are translated relative each other to not physically overlap with each other in the pointing direction.

4. The antenna arrangement according to claim 1, further comprising:
an analog distribution network, wherein the antenna array is coupled to the baseband chain via the analog distribution network.

5. The antenna arrangement according to claim 4, wherein the analog distribution network comprises at least one of: analog phase shifters, power amplifiers and low noise amplifiers.

6. The antenna arrangement according to claim 1, wherein the first polarization and the second polarization are mutually orthogonal.

7. The antenna arrangement of claim 1, wherein the antenna elements of the first sub-array and the second sub-array are located in accordance with one and the same uniform linear array.

8. The antenna arrangement according to claim 1, wherein the antenna elements of the first sub-array and the second sub-array are located in accordance with one and the same irregular one-dimensional array.

9. The antenna arrangement according to claim 8, wherein the irregular one-dimensional array is defined by two uniform linear arrays.

10. The antenna arrangement according to claim 1, wherein the antenna elements of the first sub-array and the second sub-array are located in accordance with one and the same irregular two-dimensional array.

11. The antenna arrangement according to claim 1, wherein each of the two antenna arrays are located on opposite sides of a radio transceiver device.

12. A radio transceiver device comprising:
an antenna arrangement comprising two baseband chains and two antenna arrays, wherein each of the two antenna arrays is coupled to a corresponding baseband chain of the two baseband chains,
wherein each antenna array has a pointing direction and is divided into a first sub-array and a second sub-array,
wherein the two pointing directions are opposite to each other,
wherein the first sub-array of each antenna array comprises antenna elements of only a first polarization and the second sub-array of each antenna array comprises antenna elements of only a second polarization different from the first polarization,
wherein the first polarization of one of the two antenna arrays and the first polarization of the other of the two antenna arrays are of the same polarization,
wherein the second polarization of one of the two antenna arrays and the second polarization of the other of the two antenna arrays are of the same polarization,
wherein the antenna elements of the first sub-array of a corresponding antenna array are located such that each of the antenna elements of the first sub-array has a same position within the first sub-array as a corresponding antenna element within the second sub-array of the corresponding antenna array, wherein the entire second sub-array of a corresponding antenna array is translated at least a minimum physical distance from, but not rotated, relative to the entire first sub-array of the corresponding antenna array, wherein the minimum physical distance is selected according to at least one of (i) a heat generation criterion that avoids overheating of the antenna arrangement and (ii) emission of the antenna arrangement within a regulatory emission limit.

13. A method for dual-polarization beamforming, the method being performed by a radio transceiver device comprising an antenna arrangement comprising two baseband chains and two antenna arrays, wherein each of the two antenna arrays is coupled to a corresponding baseband chain of the two baseband chains, the method comprising:

communicating signals by feeding the signals through the antenna arrangement, wherein each antenna array has a pointing direction and is divided into a first sub-array and a second sub-array, wherein the two pointing directions are opposite to each other, wherein the first sub-array of each antenna array comprises antenna elements of only a first polarization and the second sub-array comprises antenna of each antenna array elements of only a second polarization different from the first polarization, wherein the first polarization of one of the two antenna arrays and the first polarization of the other of the two antenna arrays are of the same polarization, wherein the second polarization of one of the two antenna arrays and the second polarization of the other of the two antenna arrays are of the same polarization, wherein the antenna elements of the first sub-array of a corresponding antenna array are located such that each of the antenna elements of the first sub-array has a same position within the first sub-array as a corresponding antenna element within the second sub-array of the corresponding antenna array, wherein the entire second sub-array of a corresponding antenna array is translated at least a minimum physical distance from, but not rotated, relative to the entire first sub array of the corresponding antenna array, wherein the minimum physical distance is selected according to at least one of (i) a heat generation criterion that avoids overheating of the antenna arrangement and (ii) emission of the antenna arrangement within a regulatory emission limit.

14. The antenna arrangement according to claim 1, wherein the second sub-array is stacked vertically on top of the first sub-array.

15. The antenna arrangement according to claim 1, wherein the first sub-array and the second sub-array represent their own respective uniform rectangular array (URA) within the antenna array.

16. The antenna arrangement according to claim 9, wherein each of the first sub-array and the second sub-array consist of two piece-wise uniform linear arrays with two antenna elements in each uniform linear array.

17. The antenna arrangement according to claim 1, wherein a first antenna element of the second sub-array is vertically offset from a corresponding antenna element of the first sub-array.

18. The antenna arrangement according to claim 1, wherein a first column of antenna elements of the second sub-array is vertically offset from a corresponding column of antenna elements of the first sub-array.

19. The antenna arrangement according to claim 1, wherein a first row of antenna elements of the second sub-array is vertically offset from a corresponding row of antenna elements of the first sub-array.

* * * * *